United States Patent
Pedreno

(10) Patent No.: US 10,516,801 B2
(45) Date of Patent: Dec. 24, 2019

(54) DEVICE AND METHOD FOR RECORDING A DOCUMENT EXHIBITING A MARKING

(71) Applicant: YOOZ, Aimargues (FR)

(72) Inventor: Jean-Marc Pedreno, Aimargues (FR)

(73) Assignee: Yooz, Aimargues (FR)

( * ) Notice: Subject to any disclaimer, the term of this patent is extended or adjusted under 35 U.S.C. 154(b) by 0 days.

(21) Appl. No.: 15/522,547

(22) PCT Filed: Oct. 27, 2015

(86) PCT No.: PCT/FR2015/052895
§ 371 (c)(1),
(2) Date: Apr. 27, 2017

(87) PCT Pub. No.: WO2016/066951
PCT Pub. Date: May 6, 2016

(65) Prior Publication Data
US 2017/0339304 A1  Nov. 23, 2017

(30) Foreign Application Priority Data
Oct. 28, 2014 (FR) ................................ 14 60357

(51) Int. Cl.
*H04N 1/32* (2006.01)
(52) U.S. Cl.
CPC . *H04N 1/32352* (2013.01); *H04N 2201/3226* (2013.01); *H04N 2201/3271* (2013.01)
(58) Field of Classification Search
CPC combination set(s) only.
See application file for complete search history.

(56) References Cited

U.S. PATENT DOCUMENTS

| | | | | |
|---|---|---|---|---|
| 4,431,322 A * | 2/1984 | Nally | ................. | B65H 29/58 400/605 |
| 8,194,289 B2 * | 6/2012 | Hosoda | ................. | G06T 1/0071 235/462.08 |
| 2004/0210575 A1 * | 10/2004 | Bean | ................. | G06K 9/00442 |
| 2007/0177824 A1 * | 8/2007 | Cattrone | ................. | G06F 17/30011 382/306 |
| 2009/0285471 A1 * | 11/2009 | Wall | ................. | G06K 9/00986 382/137 |
| 2010/0161993 A1 * | 6/2010 | Mayer | ................. | G06F 21/64 713/178 |

FOREIGN PATENT DOCUMENTS

GB          2169561 A *   7/1986   ............ B43K 23/126

* cited by examiner

*Primary Examiner* — Barbara D Reinier
(74) *Attorney, Agent, or Firm* — Patshegen IP LLC; Moshe Pinchas

(57) ABSTRACT

The device (10) for recording a document (130, 135) exhibiting a marking (132) produced by a stamp comprising at least one relief for successive contacting with a pigment and a surface of a document to be marked, one form of at least one said relief being representative of:
  a separator identifying a first page of the document,
  a user identifier; and/or
  an alphanumeric item of information parameterized by a user,
comprises:
  an image sensor (105) for digitizing the document into at least one image,
  a detector (110) of the marking on at least one digitized image,
  a means (115) for reading the information, the marking, representative of:
    the user identifier; and
    the alphanumeric item of information; and (Continued)

a means (120) for recording the digitized document as a function of the information read.

10 Claims, 2 Drawing Sheets

DEVICE AND METHOD FOR RECORDING A DOCUMENT EXHIBITING A MARKING

TECHNICAL FIELD OF THE INVENTION

The present invention envisages a device and a method for recording a document exhibiting a marking, and a stamp for producing such a marking. It applies, in particular, to the electronic management of documents.

STATE OF THE ART

Normally, an incoming letter is marked by a user by means of a stamp. The marking generally represents a series of alphanumeric characters representing information such as a date, location or action. This marking makes it possible, in principle, to identify that the letter been processed by a user.

With the advent of information technology, incoming letters and documents are generally digitized and stored in local or remote servers. This virtualization of document archiving frequently leads to a duplication of files digitized by two different users.

Some current systems, called "electronic document management systems", involve watermarking the documents, eg by incorporating a bar code. These systems require the incoming documents to be digitized and classified using a database identifier, eg a user identifier or file number. The drawback of these systems is that they require additional human processing to be indexed correctly in the database, and they do not prevent the risk of duplicates of digitized files.

Other current systems utilize labels stuck on the document rather than a stamp. This marking pursues the same goals as the previous technique. These labels generally have a bar code representing an identifier. As well as the shortcomings of the previous technique, the drawbacks of this technique are, firstly, that it entails an additional cost for producing the labels and, secondly, that the labels have an opaque background, which completely hides a portion of the document positioned under the attached label.

SUBJECT OF THE INVENTION

The present invention aims to remedy all or part of these drawbacks.

To this end, according to a first aspect, the present invention envisages a device for recording a document exhibiting a marking produced by a stamp comprising at least one relief for successive contacting with a pigment and a surface of a document to be marked, one form of at least one said relief being representative of:
  a separator identifying a first page of the document;
  a user identifier; and/or
  an alphanumeric item of information parameterized by a user;
which comprises:
  an image sensor for digitizing the document into at least one image;
  a detector of the marking on at least one digitized image;
  a means for reading the information, the marking, representative of:
    the user identifier; and
    the alphanumeric item of information; and
  a means for recording the digitized document as a function of the information read.

Thanks to these provisions, a user using the device can store a received, stamped and scanned document, automatically assigning the scanned document to a user in a computer network In some embodiments, the device that is the subject of the present invention comprises a means for identifying the document as a function of the position of the marking on the document and of at least one item of information read from the marking.

These embodiments make it possible to identify a similarity between two scanned documents exhibiting identical content and a marking that is identical in content and position.

In some embodiments, when the same marking is detected twice by the detector, the recording means is inhibited so that the document is not recorded, or this recording means records said document, associating to said document an item of data representative of a previous recording of a document exhibiting the detected marking.

These embodiments make it possible to avoid recording duplicates when two scanned documents exhibit identical content and a marking that is identical in content and position.

In some embodiments, the device that is the subject of the present invention comprises a means for verifying the authenticity of a document based on an image of the digitized marking.

The advantage of these embodiments is that they make it possible to detect a forged recorded document in respect of a previously recorded document using the marking.

In some embodiments, the authenticity verification means verifies the authenticity of a document based on the position of the marking in the digitized image of the document.

In this way, if two identical positions of a marking are detected on two different documents, the verification means determines that one of the two documents is not authentic.

According to a second aspect, the present invention envisages a method of recording a document exhibiting a marking produced by a stamp comprising at least one relief for successive contacting with a pigment and a surface of a document to be marked, one form of at least one said relief being representative of:
  a separator identifying a first page of the document;
  a user identifier; and/or
  an alphanumeric item of information parameterized by a user;
which comprises:
  a step of capturing the image for digitizing the document into at least one image;
  a step of detecting the marking on at least one digitized image;
  a step of reading the information, the marking, representative of:
    the user identifier; and
    the alphanumeric item of information; and
  a step of recording the digitized document as a function of the information read.

As the aims, advantages and features of the method that is the subject of the present invention are similar to those of the device that is the subject of the present invention, they are not repeated here.

In some embodiments, the method that is the subject of the present invention comprises a step of identifying the document as a function of the position of the marking on the document and of at least one item of information read from the marking.

These embodiments make it possible to identify a duplicate between two scanned documents exhibiting identical content and a marking that is identical in content and position.

In some embodiments, after the identification step, if the document is identified as being already recorded, the recording step is not performed.

These embodiments make it possible to avoid a duplicate recording when two scanned documents exhibit identical content and a marking that is identical in content and position.

In some embodiments, the method that is the subject of the present invention comprises a means for verifying the authenticity of a document based on an image of the digitized marking.

The advantage of these embodiments is that they make it possible to detect a forged recorded document in respect of a previously recorded document using the marking.

According to a third aspect, the present invention envisages a stamp for implementing the method that is the subject of the present invention, which comprises at least one relief for successive contacting with a pigment and a surface of a document to be marked, one form of at least one said relief being representative of:
- a separator between two surfaces with which the relief is contacted;
- a user identifier; and/or
- an alphanumeric item of information parameterized by a user.

As the aims, advantages and features of the stamp that is the subject of the present invention are similar to those of the method that is the subject of the present invention, they are not repeated here.

In some embodiments, the form of at least one relief representative of a user identifier is in the form of a two-dimensional bar code.

These embodiments enable the user identifier to be concealed from human sight.

In some embodiments, the stamp that is the subject of the present invention comprises form redundancy representative of a user identifier between at least two reliefs.

The advantage of these embodiments is that the user identifier is more robust.

In some embodiments, the stamp that is the subject of the present invention comprises a plurality of forms representative of user identifiers, at least two identifiers being different.

These embodiments enable a document to be assigned to a plurality of users interested in the document, for example.

In some embodiments, the alphanumeric information is a document identifier.

The advantage of these embodiments is that they enable the document to be identified in the content of the marking for said document.

BRIEF DESCRIPTION OF THE FIGURES

Other advantages, aims and particular features of the present invention will become apparent from the non-limiting description that follows of at least one particular embodiment of the device, method and stamp that are the subjects of the present invention, with reference to drawings included in an appendix, wherein.

DESCRIPTION OF EXAMPLES OF REALIZATION OF THE INVENTION

The present description is given as a non-limiting example, each characteristic of an embodiment being able to be combined with any other characteristic of any other embodiment in an advantageous way.

In the electronic document management field, the term "separator" refers to a marking physically affixed to a document allowing the electronic document management system, on detection of this marking, to determine that this marked document is a different document from the previous marked document analyzed by the system. Such a separator can be formed simply by the presence of a marking on the document, or be more complex by being representative of information. Such a separator is then, for example, a character string representative of a given specific parameter. In some variants, the separator is a symbol exhibiting a specific form with respect to the symbols utilized in the document and/or in the marking.

The term "alphanumeric item of information parameterized by a user" refers to an item of information defined by a user through a data entry device, the relief of the stamp, and therefore the form of the marking, being dependent on the information defined. This information can be, for example:
- predefined during the production of the stamp by giving one or more reliefs the form of an alphanumeric character; or
- defined by the rotation of bands equipped with reliefs, each corresponding to an alphanumeric character, with these bands being movable such that a single relief is positioned on a surface contacting with a pigment and a surface of a document, such a mechanism being similar to the mechanism utilized in a numbering stamp.

In the rest of the text, the term "recording" is used, which covers the notions of storage, indexing, locating, learning, identification and archiving in particular.

It is now noted that the figures are not to scale.

Figure 1:
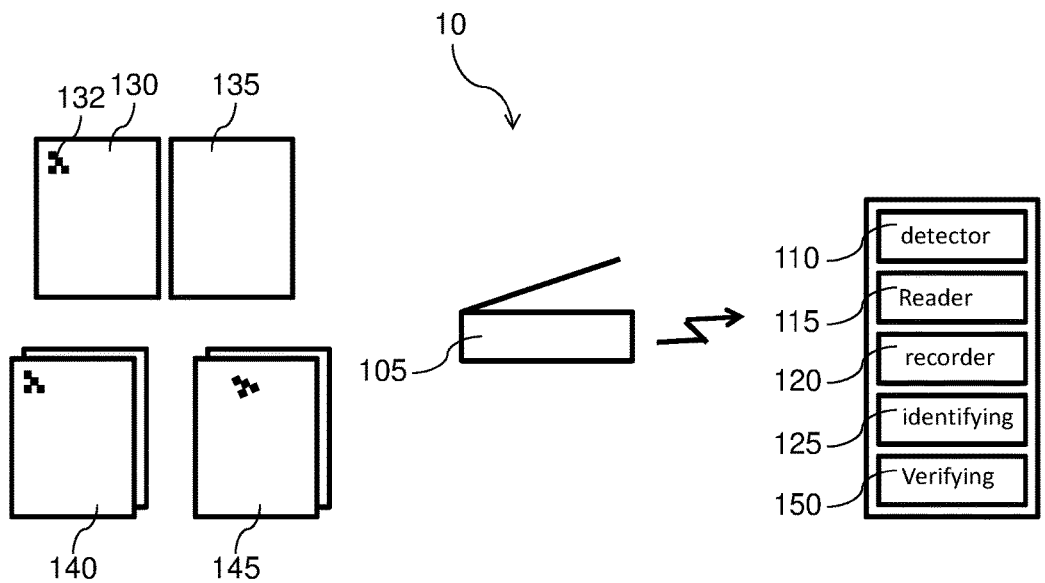
FIG. 1 represents, schematically and in cross-section, a particular embodiment of the device that is the subject of the present invention.

FIG. 1, which is not to scale, shows a cross-section view of an embodiment of the device 10 that is the subject of the present invention. This device 10 for recording a document, 130 and 135, exhibiting a marking 132 produced by a stamp comprising at least one relief for successive contacting with a pigment and a surface of a document, 130 and 135, to be marked, one form of at least one said relief being representative of:
- a separator identifying a first page of the document;
- a user identifier; and/or
- an alphanumeric item of information parameterized by a user;

comprises:
- an image sensor 105 for digitizing the document, 130 and 135, into at least one image;
- a detector 110 of the marking 132 on at least one digitized image;

a means 115 for reading the information, the marking 132, representative of:
the user identifier; and
the alphanumeric item of information;
a means 125 for identifying the document, 130 and 135, as a function of the position of the marking 132 on the document, 130 and 135, and at least one item of information read from the marking 132;
a means 120 for recording the digitized document, 130 and 135, as a function of the information read, to record a document, 130 and 135, that has been identified and not previously recorded; and
a means 150 for verifying the authenticity of a document, 130 and 135, based on an image of the digitized marking 132.

In some variants, the stamp comprises a relief, this relief being representative at the same time of:
the separator identifying a first page of the document;
the user identifier; and
the alphanumeric item of information parameterized by a user.

In some variants, the stamp comprises a plurality of reliefs, each relief being representative of an element amongst:
the separator identifying a first page of the document;
the user identifier; and
the alphanumeric item of information parameterized by a user.

In some variants, the stamp comprises a plurality of reliefs, at least two reliefs being representative together of at least one element amongst:
the separator identifying a first page of the document;
the user identifier; and/or
the alphanumeric item of information parameterized by a user.

Figure 3:
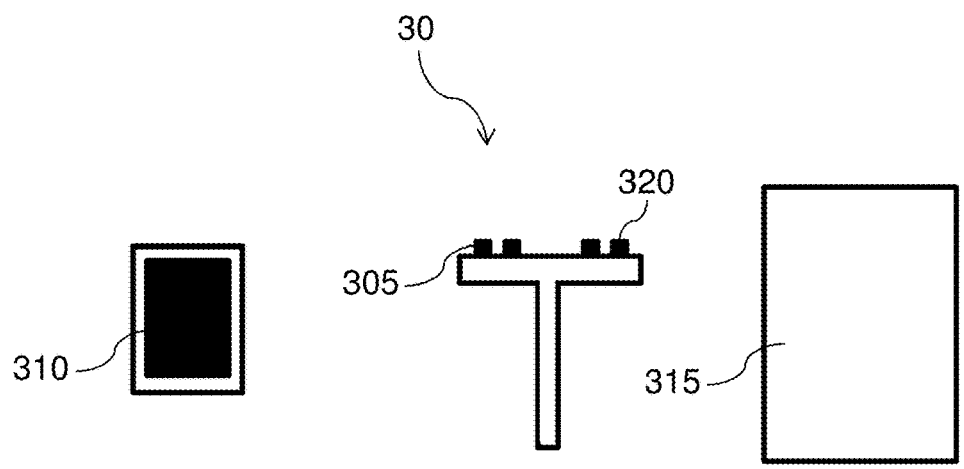
FIG. 3 represents, schematically and in cross-section, a particular embodiment of the stamp that is the subject of the present invention.

Prior to a document, 130 and 135, being recorded, this document has been marked by a stamp 30 as described with regard to FIG. 3. This stamp 30 comprises at least one relief for contacting with a pigment, such as ink for example, the relief being applied to the first page 130 of the document to deposit the pigment on said page 130. This pigment forms a marking 132, this marking comprising, for example, a set of alphanumeric characters and a two-dimensional bar code corresponding to a user identifier.

In some variants, the marking comprises a plurality of different two-dimensional bar codes identifying two users interested in the document. In other variants, the marking comprises redundancies between bar codes so as to increase the robustness of the marking in the face of wear of the medium or the pigment being poorly applied.

In some variants, the marking comprises a delineation for handwriting. This delineation is, for example, a set of compartments of predefined width, or an area delineated by two markers allowing freestyle writing. In these variants, the reading means 115 utilizes an image processing software system to detect an alphanumeric character string corresponding to the handwriting detected within the delineation for handwriting. The string read in this way is recorded together with the document. In some variants, the recording of the document is performed as a function of the character string read in this way.

The contacting between the stamp 30 and the page 130 is achieved by a user, which means that the orientation and position of two markings 132 on two identical pages are very probably different. This property is exploited for duplicate identification or document authentication. A marking 132 is positioned on each first page of a different document, such that the marking 132 automatically serves as document separator when the marking is detected by the detector 110.

In the particular example shown in FIG. 1, two first pages, 130 and 145, of two different documents have been marked by a stamp 30.

The image sensor 105 digitizes the pages, 130 and 135, of the first document. This image sensor 105 is, for example, a flatbed scanner or a scrolling scanner built into a multifunction fax machine or not. In some variants, the image sensor 105 is a portable terminal operated by a user.

The image digitized in this way is transmitted by means of any information network, or mobile storage memory such as a USB key for example, to the detector 110. This information network is, for example, wired or wireless, based on IP (abbreviation for "internet protocol") or mobile technology.

The detector 110 is, for example, an image processing software system utilized by a computing unit of a personal computer or of a server, for example. The detector 110 is configured to detect, from a digitized image, the marking 132 on a page by form recognition, the general matrix of the marking 132 being known to the detector 110.

When a marking 132 is detected, the reading means 115 reads the user identification and alphanumeric character information. For user identifiers in the form of two-dimensional bar codes, the reading means 115 transcribes the bar code into an alphanumeric character string corresponding to said identifier. This identifier is subsequently used to record the document in the file corresponding to the user identified automatically.

The identification means 125 identifies a document as a function of the position of the marking 132 on the document and of at least one item of information read from the marking. In some variants, this identification means 125 identifies a document solely as a function of the position of the marking 132. In other variants, the marking 132 comprises a document identifier read by the identification means 115 and allowing the identification means 125 to identify the document. In some variants, the identification of the document 125 is based on a portion of the content of the document so as to avoid the case in which two markings 132 exhibiting an orientation and a position that are perfectly identical identify two documents with different content as identical. "Content of the document" also means a portion of the digitized image not processed to extract the information content from it.

The means 120 for recording the document is, for example, a software system configured to write to a memory of the personal computer or server so as to record the document in a file corresponding to the user relative to the user identifier read.

In the example shown in FIG. 1, if a user scans a first document, formed by pages 130 and 135, this document is recorded in a directory or in an electronic storage structure, such as an Electronic Document Management system for example, corresponding to the user identifier.

If, subsequently, the document is again scanned, the identification means 125 detects a duplication between the marking of page 140 and page 130, these markings being identical, and the document is therefore not recorded, through inhibition of the recording means 120, or the recording means 120 records said document, associating to said document an item of data representative of a previous recording of a document exhibiting the detected marking. If a third document, exhibiting the same marking 132 in a different position and orientation, is scanned, this document is recorded since it does not correspond to a document already recorded, each document being identified by the position and orientation of the marking 132. This position and this orientation can be transcribed in a recorded unique item of data to avoid duplicates.

The means 150 for verifying the authenticity of a document is utilized based on an image of the digitized marking 132. This verification means 150 determines that a document is not authenticate when, for example, an image of the content of the document corresponds to an image of the content of another identical document and the marking 132 differs in position and/or orientation.

Figure 2:
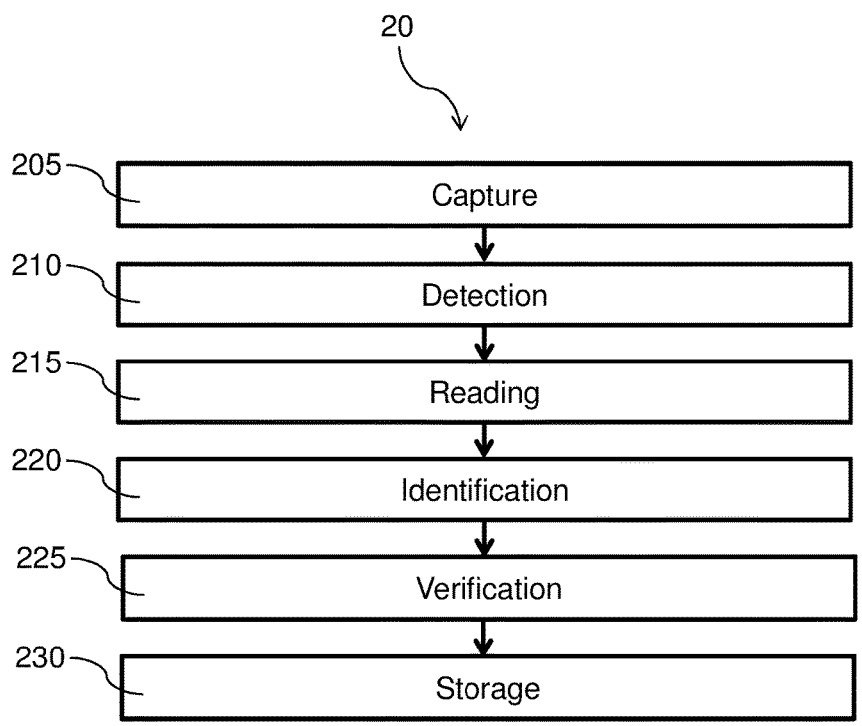
FIG. 2 represents, schematically, a logical diagram of particular steps of the method that is the subject of the present invention.

FIG. 2 shows a logical diagram of particular steps of the method 20 for recording a document exhibiting a marking produced by a stamp comprising at least one relief for successive contacting with a pigment and a surface of a document to be marked, one form of at least one said relief being representative of:
- a separator identifying a first page of the document;
- a user identifier; and/or
- an alphanumeric item of information parameterized by a user;

which comprises:
- a step 205 of capturing the image for digitizing the document into at least one image;
- a step 210 of detecting the marking on at least one digitized image;
- a step 215 of reading the information, the marking, representative of:
  the user identifier; and
  the alphanumeric item of information;
- a step 220 of identifying the document as a function of the position of the marking on the document and of at least one item of information read from the marking;
- a step 225 of verifying the authenticity of a document based on an image of the digitized marking; and
- a step 230 of recording the digitized document as a function of the information read, during which a document not recorded previously is recorded.

The image capture step 205 is implemented, for example, by a scanner or a mobile terminal. During this capture step 205, a document is digitized in the form of at least one image.

The detection step 210 is implemented by a computing unit of a personal computer, a server or a portable terminal of a user, for example. During this detection step 210, image processing is performed on the digitized images of the document so as to detect a form corresponding to the marking.

The reading step 215 is implemented, for example, by a software system configured to transpose the marking into computer data of character string type and alphanumeric data so that it can be processed by other software systems. Reading the marking makes it possible to extract, for example, the alphanumeric and user identifier information.

The identification step 220 is implemented, for example, by a software system identifying a document as a function of the position and orientation of the marking on a page of the document, this content can be an image of the information content of the document.

After the identification step, if the document is identified as being already recorded, the recording step 230 is not performed, or the recording of said document is performed, associating to said document an item of data representative of a previous recording of a similar document.

The verification step 225 is implemented, for example, by an image processing and/or automatic document reading software system configured to detect when two documents have identical content but markings whose position and/or orientation differ in order to determine the authenticity of a document.

The recording step 230 is performed, for example, by a means for controlling a local or remote memory configured to control the recording of the document as a function of the information read from the marking if this document has not already been recorded. A document duplication is detected by a document identifier assigned to the document during the identification step, this identifier depends on the position and/or orientation of the marking.

FIG. 3 shows a particular embodiment of the stamp 30 that is the subject of the present invention. This stamp 30 for implementing the method that is the subject of the present invention, comprises at least one relief 305 for successive contacting with a pigment 310 and a surface 315 of a document to be marked, one form of at least one said relief 305 being representative of:
- a separator between two surfaces with which the relief 305 is contacted;
- a user identifier; and/or
- an alphanumeric item of information parameterized by a user that can represent, for example, a document identifier.

The stamp 30 comprises, for example, a support to receive the hand of a user and to allow the stamp 30 to be pressed on a surface 315 to be marked so as to create a contact between the relief 305 and the surface 315. The relief 305 of the stamp is put into contact with a pigment 310, such as ink for example, before being put into contact with the surface 315. In some variants, the pigment is incorporated into the stamp 30 and is stored in a spongy material positioned under the support, the relief 305 being articulated in such a way that pressing the stamp 30 on the surface 315 results in deployment of the relief 305 to exert a contact on the surface 315, the relief 305 withdrawing on contact with the pigment if there is no press.

In preferred variants, the form of at least one relief 305 representative of a user identifier exhibits a two-dimensional bar code form. In some of these variants, the stamp 30 exhibits form redundancy representative of a user identifier between at least two reliefs, 305 and 320.

In some variants, the stamp 30 comprises a plurality of forms representative of user identifiers, at least two identifiers being different.

The stamp 30 comprises, for example, four reliefs in the form of two-dimensional bar codes delimiting a square space in which are positioned the reliefs whose form is representative of the alphanumeric item of information. This alphanumeric item of information corresponds, for example, to a date. The two-dimensional bar codes represent, for example, an item of information which holds eight characters, the identifier allowing either the stamp 30 or the user of the stamp 30 to be identified.

In some variants, a predefined particular combination of characters of the alphanumeric item of information leading, in the device 10, to the information contained in the marking not being recorded, the marking therefore serving solely as separator between two documents.

Figure 4:
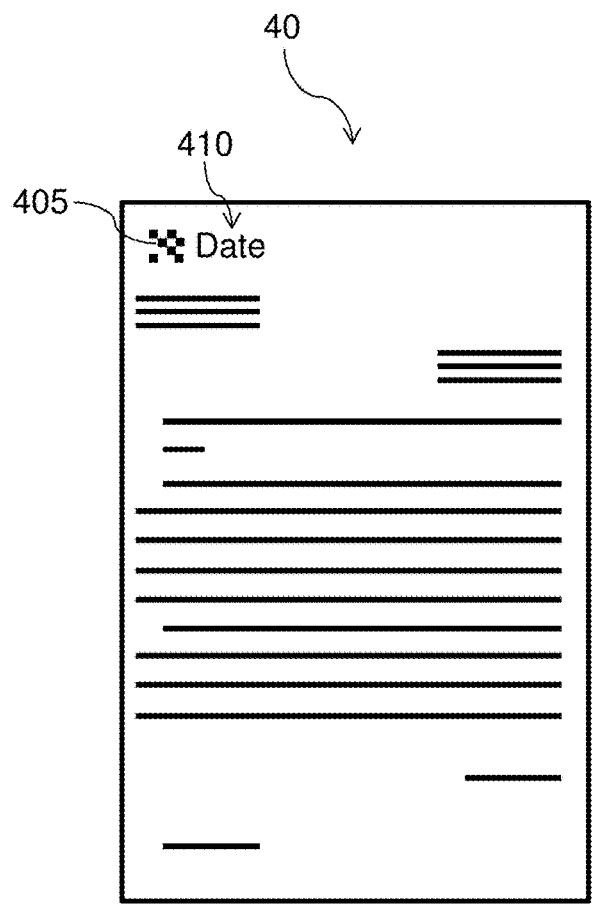
FIG. 4 represents, schematically and in a front view, a particular embodiment of the marking made with the stamp that is the subject of the present invention.

FIG. 4 shows an example of a document 40 marked by a stamp 30 that is the subject of the present invention. This marking exhibits, firstly, a user identifier 405 in the form of a two-dimensional bar code and, secondly, a date 410.

The invention claimed is:
1. Device for recording a document exhibiting a marking having a pigment disposed on a surface of the document the marking being representative of:

a separator identifying a first page of the document;
a user identifier; and/or
an alphanumeric item of information parameterized by a user;
the device comprising:
an image sensor for digitizing the document into at least one image,
a detector for detecting the marking on said image and the position of said marking,
a means for reading the information, represented by the marking, including at least one of: the user identifier and the alphanumeric item;
a means for recording the image as digitized document having unique data related to the position of said marking, said means for recording is configured to record the digitized document in accordance with the information from said means of reading; and,
a means for identifying the digitized document in accordance with the unique data and at least one item of the information read from the marking, said means for identifying is configured to detect a duplicate document with respect to a previously recorded digitized document in accordance with said unique data and the at least one item of the information;
wherein said means for recording is configured to preclude recording the digitized document
when detected by said means for identifying as the duplicate document; and
wherein said means for identifying further configured for identifying the document as a function orientation of the marking.

2. The device according to claim 1 wherein said means for recording is configured such that when the digitized document is detected as the duplicate document said recording means records the image as a digitized document having an item of data associating said duplicate document with the previously recorded digitized document.

3. The device according to claim 1, which comprises a means for verifying the authenticity of the document based only on said marking.

4. The device according to claim 3, wherein the authenticity verification means verifies the authenticity of a document based on the position of the marking in the digitized image of the document and the content of a document such that when said content of the document corresponds to content of a previously recorded digitized document while the position of the marking is not identical the authenticity of a document is not verified.

5. Method for recording a document exhibiting a marking having a pigment disposed on a surface of the document the marking being representative of:
a separator identifying a first page of the document;
a user identifier; and/or
an alphanumeric item of information parameterized by a user;
the method comprising:
a step of capturing an image of the document for digitizing the document;
a step of detecting the marking on said image and the position of said marking;
a step of reading the information represented by the marking, including at least one of: the user identifier; and
the alphanumeric item of information; and
a step of recording the image as digitized document in accordance with the information obtained during said step of reading, said step of recording includes recording said digitized document together with unique data related to the position of said marking
a step of identifying the digitized document in accordance with the unique data and of at least one item of the information read from the marking; and,
step of detecting a duplicate document with respect to a previously recorded digitized document in accordance with said unique data and at least one item of the information; said step of recording includes precluding recording the digitized document when detected during said step of detecting as the duplicate document
wherein said step of identifying further includes identifying the document as a function orientation of the marking.

6. The method according to claim 5 wherein, when the digitized document is detected as a duplicate document said step of recording includes recording the image as a digitized document having an item of data associating said duplicate document with the previously recorded digitized document.

7. The method according to claim 5, which comprises a step of verifying the authenticity of a document based on an image of the digitized marking and the content of a document, such that when said content of the document corresponds to content of a previously recorded digitized document while the position of the marking is not identical the authenticity of a document is not verified.

8. Method for recording documents in an electronic documents management system the method comprising:
stamping a document with a marking by applying a pigment on a surface of the document, the marking being representative of at least one of:
a separator identifying a first page of the document;
a user identifier; and
an alphanumeric item of information parameterized by a user;
capturing an image of the document for digitizing the document;
detecting the marking on said image and the position of said marking;
reading the information represented by the marking, including at least one of:
the user identifier; and
the alphanumeric item of information; and
recording the image as digitized document in accordance with the information obtained during said reading, said recording includes recording said digitized document together with unique data related to the position of said marking;
identifying the digitized document in accordance with the unique data and at least one item of the information read from the marking; and,
detecting a duplicate document with respect to a previously recorded digitized document in accordance with said unique data and at least one item of the information;
wherein said recording includes precluding recording the digitized document when detected during said step of detecting as a said duplicate document
wherein said identifying further includes identifying the document as a function orientation of the marking.

9. The method of claim 8 wherein said marking includes a plurality of forms each of which being representative of a user identifiers.

10. The method of claim 8 wherein said alphanumeric item of information is a document identifier.

* * * * *